United States Patent Office 2,829,129
Patented Apr. 1, 1958

2,829,129
DYESTUFF-POLYPHOSPHATE COMPOSITION

Peter William Brett Semmens and George Edward Penketh, Norton-on-Tees, England, assignors to Imperial Chemical Industries Limited, a corporation of Great Britain No Drawing. Application September 14, 1954
Serial No. 456,066

Claims priority, application Great Britain
October 16, 1953

3 Claims. (Cl. 260—79)

This invention relates to the production of polymeric materials.

It has already been proposed to produce polymeric materials by treating alkali-metal polyphosphates with a quaternary ammonium halide. The resins produced in this manner are, in general, translucent, colourless solids with relatively low heat stability.

In contrast to these polymeric materials, the polymeric materials produced by the process of the present invention have a higher heat stability and are coloured.

According to the present invention, there is provided a process for the production of coloured polymeric materials which comprises the step of reacting a solubilised potassium polyphosphate, produced as hereinafter defined, with an aqueous solution of a dyestuff containing tertiary amino groups, only a proportion of which are quaternised at any one time.

Solubilised polyphosphates suitable for use in the process of the present invention may be produced by any of the following methods:

(a) Powdered potassium polyphosphate may be added to water, and contacted with the sodium salt of a cation exchange resin, such as, for example, the sodium salt of a sulphonated poly-styrene or of a sulphonated phenolic resin. The potassium polyphosphate, on treatment in this manner, goes into solution as a sodium potassium polyphosphate.

(b) Instead of using a sodium salt of a cation exchange resin as described in (a) above, it is possible to use an ammonium salt of a cation exchange resin. When operating in this manner, the potassium polyphosphate goes into solution as ammonium potassium polyphosphate.

(c) The methods of solubilising polyphosphates using sodium or ammonium salts of ion exchange resins have the disadvantage that the resin must either be discarded after use, or regenerated. An alternative method for producing sodium potassium polyphosphates, which may be used with advantage in the production of polymeric materials according to the process of the present invention, is to allow a powdered potassium polyphosphate to stand in contact with a solution of a sodium salt, for example, sodium chloride. The product, which swells during this treatment, may be separated and dissolved in water to give a viscous solution suitable for use in the process of the present invention.

(d) On treating potassium polyphosphate with hydrogen peroxide, the potassium polyphosphate is solubilised. For example, potassium polyphosphate may be added to hydrogen peroxide. Preferably, the hydrogen peroxide, which in general contains a small quantity of acid, is neutralised prior to use by the addition of a small quantity of alkali.

It is desirable when using a solubilised potassium polyphosphate as described above, for the solution to have a viscosity greater than fifteen times that of water at a concentration equivalent to 0.1% by weight of $KPO_3$.

The solubilised polyphosphate is then contacted with an aqueous solution of a dyestuff containing tertiary amino groups, only a proportion of which are quaternised at any one time.

A suitable dyestuff is, for example, the blue compound obtained by reacting copper-tri-(chloromethyl)-phthalocyanine with tetramethyl thiourea. This dyestuff contains groupings having the structure:

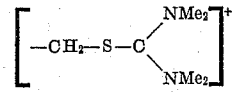

and in consequence it will be understood that in this compound only 50% of the tertiary amino groupings are quaternised at any one time.

The second dyestuff which may be used in the process of the present invention is the yellow dyestuff obtained by reacting di(chloro-methyl)-4,4'-di(6-methyl-benzthiazyl-2)-azobenzene with tetramethyl thiourea. This yellow dyestuff contains the same grouping as that depicted above for the blue dyestuff. A third dyestuff which may be used is the violet dyestuff obtained by reacting bis-chloromethylated isodibenzanthrone with tetramethyl thiourea.

The aqueous solutions of the dyestuffs mentioned above are not completely stable when the said solutions are neutral and in consequence it is desirable to add to the solutions sufficient mineral acid to lower the pH to slightly below 6. On the other hand, an excess of mineral acid must be avoided since polyphosphates are hydrolysed in the presence of strong acids.

The blue polymeric material obtained by the process of the present invention is stable towards heat up to temperatures of at least 250° C. The yellow polymeric material softens at a temperature of 200° C.

The polymers obtained may contain residual sodium, potassium or ammonium ions. However, provided a major proportion of these ions present in the solubilised polyphosphate have been replaced during the reaction, the product will have the desired properties.

The polymeric materials may be used for example, in the formulation of non-inflammable moulding compositions, and as additives to lubricating oils.

Example 1

2.5 grams of potassium polyphosphate were added to 50 mls. of a solution containing sufficient sodium chloride to give a potassium:sodium atomic ratio of 1:2. The mixture was stirred slowly for 1 hour, the solution poured off and 180 mls. of water added. After rapid agitation nearly all of the swollen residue passed into solution. A small amount of undissolved material was separated by filtration.

To 100 mls. of the clear liquid obtained in this manner 270 mls. of a 1.5% by weight solution of the blue dyestuff obtained by reacting copper tri-(chloromethyl)-phthalocyanine with tetramethyl thiourea were added slowly with constant stirring. A flocculent blue precipitate was formed which coagulated sufficiently to be collected by hand, kneaded to remove water and washed. When dried, the product was a dark blue crumbly solid, which did not soften at 250° C.

Example 2

Example 1 was repeated except that 230 mls. of a 1.5% by weight solution of the yellow dyestuff obtained by reacting di - (chloromethyl) - 4,4' - di - (6 - methyl-benzthiazyl-2)-azobenzene with tetramethyl thiourea were used instead of the 270 mls. of the solution of the blue dyestuff. The product after being dried was a yellowish brown crumbly solid which softened when heated to a temperature of 200° C.

Example 3

120 grams of air dried ion exchange resin sold under the registered trademark "Zeo-Karb 215" were activated into the ammonium form by treatment with ammonium chloride. The exchange resin was then washed free from chloride ions. Water was then added to the resin to give a volume of 600 mls. 9 grams of potassium polyphosphate were added and the mixture stirred in the cold for 45 minutes, after which the temperature was raised slowly to 50° C. when complete solution occurred. The resin was removed by filtration and the resulting solution had the following analysis:

| | Percent by weight |
|---|---|
| $P_2O_5$ as $KPO_3$ | 1.58 |
| $NH_4$ | 0.2 |
| K | 0.1 |

To 50 mls. of this solution, a 2% by weight aqueous solution of the yellow dyestuff obtained by reacting di-(chloromethyl) - 4,4' - (6 - methyl - benzthiazyl - 2)-azobenzene with tetramethyl thiourea was added. 110 mls. of the yellow dyestuff were required for complete precipitation. The product was similar to that obtained in Example 2.

Example 4

A solution was prepared by admixing 200 mls. of 29% w./v. hydrogen peroxide, 200 mls. of water and 2 mls. of normal sodium hydroxide. To this solution 8 grams of potassium polyphosphate were added and the mixture vigorously stirred. After 15 minutes the potassium polyphosphate had completely dissolved. A further 130 mls. of water were then added to the solution, which then contained 1.45% of $KPO_3$.

50 mls. of this solution were then reacted with a 2% by weight solution of the yellow dyestuff as described in Example 3. 115 mls. of this were required to give complete precipitation. The product was similar to that obtained in Example 2.

Example 5

6 grams of potassium polyphosphate were suspended in 120 mls. of a 5% by weight sodium chloride solution. The product was separated and dissolved in 380 mls. of water to give a solubilised potassium polyphosphate containing 1.60% $KPO_3$.

To 50 mls. of this solution, a 2% by weight aqueous solution of the violet dyestuff obtained by reacting bis-chloromethylated isodibenzanthrone with tetramethyl thiourea was slowly added. 130 mls. of the dyestuff solution were required to obtain complete precipitation. The product was a violet crumbly solid.

We claim:

1. A process for the production of colored polymeric materials which comprises the step of reacting a solubilised potassium polyphosphate having a viscosity greater than fifteen times that of water at a concentration equivalent to 0.1% by weight of $KPO_3$, with an aqueous solution of a dyestuff containing isothiouronium groups, selected from the group consisting of the blue compound obtained by reacting copper-tri-(chloromethyl)-phthalocyanine with tetramethyl thiourea, the yellow compound obtained by reacting di(chloro-methyl)-4,4'-di(6-methyl-benzthiazyl-2)-azobenzene with tetramethyl thiourea, and the violet compound obtained by reacting bis-chloromethylated isodibenzanthrone with tetramethyl thiourea.

2. The process of claim 1 wherein the aqueous solution of said dyestuff is adjusted to a pH slightly below 6 by the addition of mineral acid.

3. A process for the production of colored polymeric materials which comprises the step of reacting a solubilized potassium polyphosphate having a viscosity greater than fifteen times that of water at a concentration equivalent to 0.1% by weight of $KPO_3$, with an aqueous solution of a dyestuff containing tetramethyl isothiouronium groups obtained by reacting a dyestuff selected from the group consisting of chloromethyl-group substituted phthalocyanine, azobenzene and benzanthrone dyestuffs with tetramethyl thiourea.

References Cited in the file of this patent

UNITED STATES PATENTS

| 2,071,385 | Bell | Feb. 23, 1937 |
| 2,429,579 | Horvath | Oct. 21, 1947 |
| 2,592,273 | Goebel et al. | Apr. 8, 1952 |

FOREIGN PATENTS

| 576,270 | Great Britain | May 26, 1946 |
| 613,980 | Great Britain | Dec. 7, 1948 |
| 619,035 | Great Britain | Mar. 2, 1949 |

OTHER REFERENCES

Iler et al.: J. Physical Chem., vol. 56, 1952 p. 1086–1089. (Copy in Scientific Library.)

Munter et al.: Amer. Dyestuff Reporter, Jan. 28, 1935, p. 40, 43 and 44. (Copy in Scientific Library.)

Venktaraman: The Chemistry of Synthetic Dyes, Academic Press, 1952, p. 270 and 271. (Copy in Scientific Library.)